United States Patent [19]

Inoue

[11] 4,418,263

[45] Nov. 29, 1983

[54] ELECTROEROSIVE WIRE-CUTTING METHOD AND APPARATUS WITH A SHAPED WIRE ELECTRODE

[75] Inventor: Kiyoshi Inoue, Tokyo, Japan

[73] Assignee: Inoue-Japax Research Incorporated, Yokohama, Japan

[21] Appl. No.: 240,246

[22] Filed: Mar. 3, 1981

[30] Foreign Application Priority Data

Mar. 7, 1980 [JP] Japan .................................. 55-28979

[51] Int. Cl.³ ............................................... B23P 1/08
[52] U.S. Cl. ............................. 219/69 W; 219/69 M; 219/69 E
[58] Field of Search ................. 219/69 R, 69 E, 69 V, 219/69 W, 68, 69 M

[56] References Cited

U.S. PATENT DOCUMENTS 3,609,280  9/1971  Kholodnov et al. ............ 219/69 W

FOREIGN PATENT DOCUMENTS 1474443  8/1974  United Kingdom .

*Primary Examiner*—M. H. Paschall
*Attorney, Agent, or Firm*—Karl F. Ross; Herbert Dubno

[57] ABSTRACT

A method of and an apparatus for electroerosively wire-cutting a conductive workpiece with a continuous wire electrode supported to extend and axially transported to move between a supply site and a collection site through a cutting zone. The moving wire electrode is juxtaposed in the cutting zone with the workpiece to form a machining gap therewith supplied with a machining liquid. A machining current is passed through the gap to electroerosively remove material from the workpiece. The moving wire electrode and the workpiece are relatively displaced along a predetermined path which defines the desired pattern of wire cut in the workpiece. The wire electrode fed from a supply reel is of a regular cross-sectional contour (e.g. circular) which is, upstream of the cutting zone, shaped into a cross-sectional contour (e.g. square or triangular) preselected in conjunction with the desired pattern of cut to be formed in the workpiece. The shaping means may take the form of a drawing die or an electroerosive wire-cutting electrode assembly.

15 Claims, 6 Drawing Figures

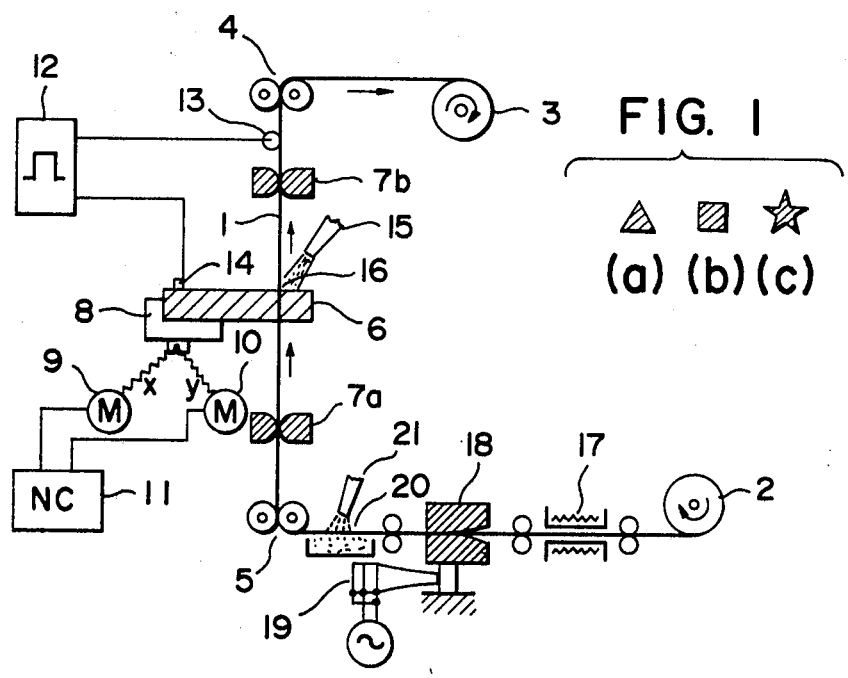
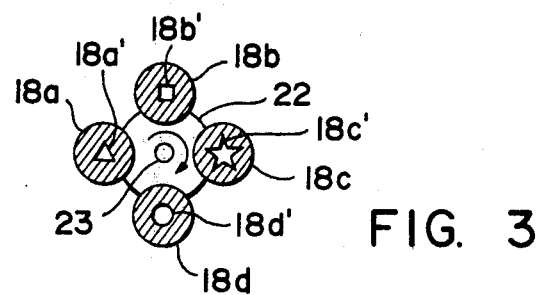

ELECTROEROSIVE WIRE-CUTTING METHOD AND APPARATUS WITH A SHAPED WIRE ELECTRODE

FIELD OF THE INVENTION

The present invention relates generally to electroerosive wire-cutting and, more particularly, to a new and useful method of and apparatus for electroerosively wire-cutting a conductive workpiece with a continuous wire electrode supported to extend and axially transported continuously to move, between a supply site and a collection site thorugh a cutting zone in which the workpiece is disposed.

BACKGROUND OF THE INVENTION

The electroerosive wire-cutting process, as the term is generally recognized in the art, makes use of a continuous wire electrode composed of, say, copper or brass and in a regular thin wire form, i.e. circular in cross section, and having a diameter ranging between 0.05 and 0.5 mm. The wire is mounted in a wire-support structure to extend from a supply site, e.g. a wire supply reel or drum, to a collection site, e.g. a wire takeup reel or drum and is axially transported by drive means, e.g. a traction roller arrangement located in the collection site, to travel along a guided continuous path and to move continuously through a cutting zone. A workpiece disposed in the cutting zone is juxtaposed with the moving wire to define a machining gap therewith which is flooded with a machining liquid medium. An electrical machining current is passed between the moving wire constituting a tool electrode and the workpiece constituting a counter-electrode to electroerosively remove material from the workpiece. Meanwhile, the workpiece is displaced relative to the moving wire electrode generally transversely to the axis thereof along a predetermined path so that a desired wire-cut pattern determined by the path of relative displacement is generated in the workpiece. The term "electroerosive" or "electroerosion" is used herein to refer to a machining process wherein material removal is effected as a result of passage through the machining gap of a high-density electrical current which may take the form of a succession of discrete, time-spaced electrical discharges which occur at a high frequency, or the form of a strong electrolytic solubilization current which may either be continuous or pulsed, or a combination of the action of electrical discharge with the electrolytic solubilization action. Depending upon the particular action of material removal desired, the machining liquid has a composition enabling it to act as dielectric, conductive or dielectric/conductive gap medium. Water may be deionized or rendered ionic to various extents to present a favorable EDM (electrical discharge machining), ECM (electrochemical machining) or ECDM (electrochemical-discharge machining) liquid medium. The gap flushed with the machining liquid must be of a small size, generally in the order of microns, to establish and maintain the electroerosive gap condition between the moving wire electrode and the workpiece. The continuous axial movement of the wire electrode provides continuous renewal of the machining surface thereon juxtaposed with the workpiece across the machining gap and is required because the wire electrode must be thin as before mentioned.

The basic principle of the wire-cutting electroerosion process is therefore to achieve a desired pattern of cut or to shape the pattern by effecting the corresponding patterning or contouring feed between the workpiece and a "line" (i.e. linear) electrode constituted by the wire. This is a basic distinction from the sinking-type electroerosion process in which the tool electrode is shaped and the electrode shape is reproduced in the workpiece. In the wire-cutting electroerosion process there is no analogy between the contour of the wire electrode and a desired pattern of cut to be formed in the workpiece. The "line" electrode effectively follows a prescribed path in the workpiece which directly produces the desired pattern of cut. Therefore the accuracy of a wire-cut pattern is affected by the accuracy of the contouring feed path prescribed and followed in the relative movement between the wire electrode and the workpiece. There has been no recognition in the art that the shape of the wire electrode may affect the accuracy of a wire-cut pattern in the workpiece. Accordingly it has been generally believed that it suffices to use a wire electrode of circular or regular cross-section which is readily available in sufficient thickness or as thin as 0.05 to 0.5 mm in order to achieve a desired accuracy since the accuracy is dependent on the question of precisely setting a contouring feed path and having the wire electrode precisely follow the precision-set path.

OBJECTS OF THE INVENTION

It is an important object of the present invention to provide a new and useful method of and apparatus for electroerosively wire-cutting an electrically conductive workpiece.

Another object of the invention is to provide an electroerosive wire-cutting method and apparatus which allow a conductive workpiece to be wire-cut with greater precision.

SUMMARY OF THE INVENTION

In accordance with the present invention, in a first aspect thereof, there is provided a method of electroerosively wire-cutting a conductive workpiece with a continuous wire electrode supported to extend and axially transported continuously to move between a supply site and a collection site through a cutting zone, which method comprises: (a) feeding the wire electrode having a regular cross-secctional contour from the supply site; (b) downstream of he supply site and upstream of the cutting zone, shaping the wire electrode and forming it with a cross-sectional contour deviating from the regular contour and preselected in conjunction with a pattern of cut to be machined in the workpiece; (c) feeding the wire electrode shaped with the preselected cross-sectional contour into the cutting zone to permit the wire electrode to continuously move therethrough in an electroerosive wire-cutting relationship with the workpiece and to be fed continuously towards the collection site; and (d) effecting relative displacement of the workpiece and the moving wire electrode transversely to the axis of the wire electrode along a predetermined path to form the desired wire-cut pattern corresponding thereto in the workpiece.

The shaping step (b) may be carried out by drawing the wire electrode with the regular cross-section through a die with an opening of the cross-sectional contour complementary to the said preselected cross-sectional contour to yield the wire electrode with the said preselected cross-sectional contour for feeding into the cutting region. Alternatively the shaping step (b)

may be by electroerosion. To this end, one or more auxiliary wire electrodes as may be necessary, may be mounted to form a contouring wire network or electrode system arranged in a configuration corresponding to the said preselected cross-sectional contour through which the wire electrode from the supply site is fed and electroerosively machined to result in the wire electrode with the said preselected cross-sectional contour for feeding into the cutting zone. In a further alternative, the step (b) may be carried out by cutting or grinding with a cutting or grinding tool.

The invention also provides, in a second aspect thereof, an apparatus for electroerosively wire-cutting a conductive workpiece with a continuous wire electrode supported to extend and axially transported continuously to move between a supply site and a collection site through a cutting zone, which apparatus comprises: (a) wire supply means disposed at the supply site for feeding the wire electrode of a regular cross-sectional contour; (b) shaping means disposed downstream of the supply means and upstream of the cutting zone for forming the wire electrode with a cross-sectional contour varied from the regular contour and preselected in conjunction with a pattern of cut to be machined in the workpiece; (c) wire-feed means for feeding the wire electrode shaped with the preselected cross-sectional contour into the cutting zone to permit the wire electrode to continuously move therethrough in an electroerosive cutting relationship with the workpiece and to be fed continuously towards the collection site, and (d) contouring feed means for effecting relative displacement of the workpiece and the moving wire electrode transversely to the axis of the wire electrode to form the desired wire-cut pattern corresponding thereto in the workpiece.

The shaping means (b) may comprise a die member with an opening having a contour complementary to the said preselected contour and disposed in the path of the wire electrode fed by the supply means (a) from the supply site for drawing the wire electrode with the regular cross-sectional contour to yield the wire electrode with the said preselected cross-sectional contour for feeding into the cutting zone by the wire-feeding means (c). Alternatively, the shaping means (b) may comprise a cutting or grinding tool disposed in the path of the wire electrode for cutting or grinding the latter to form it with the said preselected contour. Still alternatively, the shaping means may comprise an electroerosion electrode system. To this latter end, one or more auxiliary wire electrodes, as necessary, may be mounted to form a contouring wire network or system arranged in a configuration corresponding to the said preselected cross-sectional contour through which the wire electrode from the supply means is fed and electroerosively machined to yield the wire electrode with the said preselected cross-sectional contour for feeding by said feed means (c) into the cutting zone.

The cross-sectional contour to be imparted by the shaping means (b) to the wire electrode fed from the supply means (a) may be triangular, square, semi-circular, asterisk or of any other shape preselected depending upon the particular pattern of cut to be machined in the workpiece. In spite of the existing belief that the thin wire electrode in the wire-cutting electro-erosion process may be of any regular available form such as a circular form and that there would be no particular need to choose any particular cross-sectional contour of a wire electrode as regards the cutting precision rather than its availability, I have found that it is a highly effective approach to feed into the cutting zone a wire electrode shaped with a particular cross-sectional contour preselected in conjunction with a particular pattern of cut to be machined in the workpiece. This has been found to be desirable and effective in a variety of machining applications where the requirement for sharpness of a corner cut or smoothness of a cut angle is severe and a fine and intricate wire-cut pattern is to be produced. In addition to the importance of shaping the wire electrode with a particular cross-sectional contour preselected in conjunction with such a wire-cut pattern, I have found it to be extremely desirable to conduct the shaping in the continuous wire stretch mounted in an electroerosive wire-cutting arrangement and immediately prior to wire entry into the cutting zone.

BRIEF DESCRIPTION OF DRAWING

These and other objects, features and advantages of the present invention will become more readily apparent from the following description as taken with reference to the accompanying drawing in which:

FIGS. 1(a), 1(b) and 1(c) are transverse cross-sectional views of contours to be selectively imparted to a wire electrode of regular cross-section in a step or by means according to the invention;

FIG. 2 is a schematic diagram partly in a block form and partly in section diagrammatically illustrating an embodiment of the invention in which a wire electrode supplied from a supply site is shaped by a die member disposed upstream of the cutting zone;

FIG. 3 is a cross-sectional view of a die shaping system having a plurality of die members selectively moved in position to present their respective die openings of different shapes in the path of the wire electrode;

SPECIFIC DESCRIPTION

Figure 4:
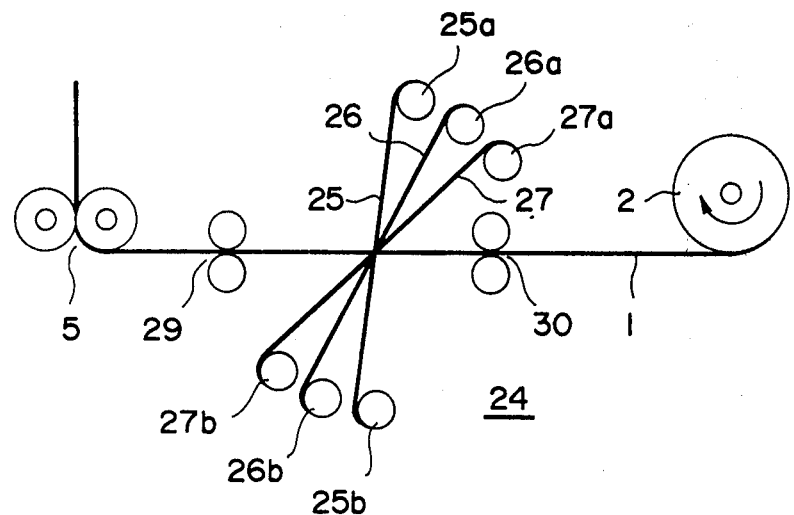
FIG. 4 is an elevational section diagrammatically illustrating a plurality of shaping wire electrodes for machining the wire electrode prior to entry into the cutting zone to form it with a desired cross-sectional contour.

Referring now to FIG. 2, a continuous wire electrode 1 is shown supported to extend and axially transported continuously to move between a supply site 2 in the form of a supply reel 2 and a collection site 3 in the form of a takeup reel 3. The wire electrode 1 is axially transported by a traction drive unit 4, e.g. capstan and pinch rollers, driven by a motor and provided on the side of the takeup reel 3. A wire braking mechanism driven by a motor is provided on the side of the supply reel 2 and, in conjunction with the traction drive 4, applies an appropriate tension to the wire electrode 1 and allows the latter to travel at an appropriate rate. A workpiece 6 is shown disposed in the path of wire travel between a pair of machining guide members 7a and 7b. The guide members 7a and 7b are provided to establish therebetween a linear path of the moving wire electrode 1 to precisely position the latter in electroerosive machining relationship with the workpiece 6.

The workpiece 6 is securely mounted on a worktable 8 driven by a pair of motors 9 and 10 furnished with drive signals from a numerical controller 11. An electroerosion power supply 12 has a pair of terminals one of which is connected to the wire electrode 1 via a brush 13 and the other of which is connected to the workpiece 6 via a conductor 14 attached thereto. A nozzle 15 is oriented to the cutting zone to supply a machining liquid 16 into a machining gap defined between the moving wire electrode 1 and the workpiece 6. For the purposes of the invention, the wire electrode 1 fed from the supply reel 2 may be of any regular cross-sectional contour, e.g. circular in cross section. In other words, a spool of wire 1 composed of, say, copper or brass and having a thickness ranging from 0.05 to 0.5 mm which is available in the marketplace may be used as the reel 2.

In the embodiment of FIG. 2, the wire electrode 1 of the regular cross-sectional contour is shaped by die means to yield the wire electrode of a preselected cross-sectional contour—of a shape as shown in FIGS. 1(a), 1(b) or 1(c)—varied from the regular cross-sectional contour. The wire electrode 1 of the regular cross-sectional contour fed from the supply reel 2 is first passed through a heating zone 17 and then drawn through a die 18. The die 18 has an opening of a shape as shown in FIG. 1(a), 1(b) or 1(c) through which the wire electrode 1 is forced to pass by means of the traction drive unit 4 so as to be shaped with the complementary cross-sectional contour. The die 18 is provided with a sonic or ultrasonic horn 19 energized by a power supply to impart sonic or ultrasonic vibrations to the die 18 to facilitate the drawing of the wire electrode 1. The drawn wire electrode 1 with the shaped cross-section is passed to a cooling zone 20 supplied with a coolant from a nozzle 21 to acquire a greater tensile strength.

The wire electrode 1 with the selected cross-sectional contour is then passed over rollers 5 to enter into the cutting zone defined between the guide members 7a and 7b where it is moved in an electroerosive machining relationship with the workpiece 6. A succession of machining pulse in an EDM, ECM or ECDM mode or a unidirectional current in an ECM or ECDM mode is applied between the moving wire electrode 1 and the workpiece 6 across the machining gap flushed with the machining liquid medium to electroerosively remove material from the workpiece 6. When, for example, the shaped wire electrode 1 is triangular in cross-section, one of the three wire surfaces juxtaposed with a corner of a pattern being cut in the workpiece 6 is capable of electroerosively machining that portion with a reduced radius of curvature and hence with an increased accuracy.

FIG. 3 shows a versatile die system comprising a plurality of four dies 18a, 18b, 18c and 18d with die openings in the shape of a triangle 18a', square 18b', asterisk 18c' and circle 18d', respectively. The die members 18a, 18b, 18c and 18d are secured to a disk 22 rotatable about a shaft 23 to selectively bring one of the die openings 18a', 18b', 18c' and 18d' into the path of travel of the wire 1 fed from the heating zone 17 (FIG. 2). The opening 18a' when selected shapes the wire 1 with a triangular cross-sectional contour. The opening 18b' when selected shapes the wire 1 with a square cross-sectional contour. The opening 18c' when selected shapes the wire 1 with an asterisk-shaped cross-sectional contour. The opening 18d' when selected shapes the wire 1 with a circular cross-sectional contour of a reduced diameter. One of these shapes is selected in conjunction with a particular pattern of cut to be machined in the workpiece 6 in the cutting zone.

Figure 5:
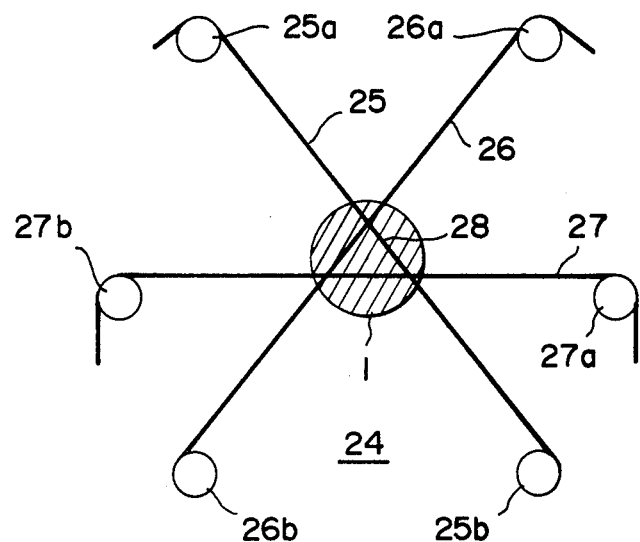
FIG. 5 is a cross-sectional view of the shaping wire electrodes in the process of machining the wire electrode in FIG. 4.

Any of various other wire shaping devices may be substituted for the die-drawing device 18 in the arrangement of FIG. 1. For example, a cutting or grinding tool device may be employed to mechanically or abrasively shape the wire electrode 1 with a preselected cross-sectional contour. A preferred shaping device makes use of electroerosion, however. FIGS. 4 and 5 show an electroerosion electrode assembly 24 designed to shape the wire electrode 1 of a regular cross-section fed from the supply reel 2 with a triangular cross section. The electrode assembly 24 comprises three wire electrodes 25, 26 and 27, each having a thickness much less than that of the cutting wire electrode 1 and supported on a pair of guide members 25a and 25b, 26a and 26b, 27a and 27b to provide a moving wire stretch therebetween. The guide members 25a, 25b, 26a, 26b, 27a and 27b are located to produce a triangular wire network 28 in the path of travel of the wire electrode 1 between a pair of machining guide members 29 and 30 in the shaping zone arranged between the supply reel 2 and the guide roller unit 5 so that the triangular wire network 28 is traversed by the moving wire electrode 1 in its longitudinal direction. A machining liquid is supplied to the shaping zone while an electric current is passed between each of the shaping wire electrodes 25, 26 and 27 and the cutting wire electrode 1 to electroerosively machine the latter into the triangular cross-sectional contour. The number of the shaping wire electrodes 25, 26, etc. and the positions of the associated guides 25a, 25b, 26a, 26b, etc. relative to the axis of the cutting wire electrode 1 are determined in conjunction with the particular cross-sectional shape of the wire electrode 1 desired. For example, when a square is desired, four machining wires are used and each pair of them arranged in parallel with one another with a spacing equal to the side of the square. A semi-circle is obtained by using a single machining wire 25, 26 or 27 supported by guide members 25a and 25b, 26a and 26b or 27a and 27b to intersect with the center axis of the cutting wire electrode 1. Advantages of the electroerosion assembly 25 are ease in setting and capability of shaping practically without mechanical stress.

Figure 6:
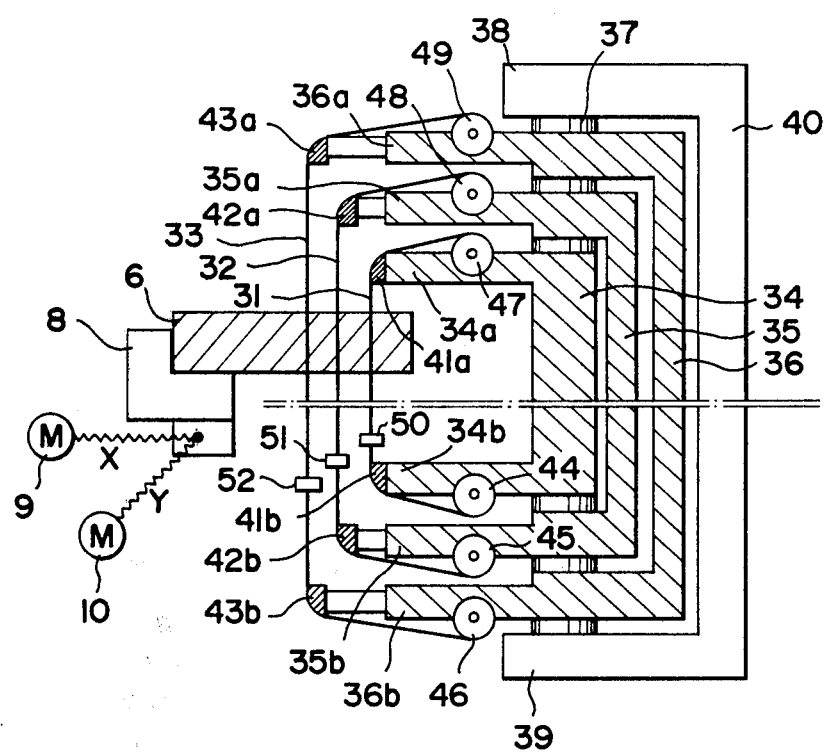
FIG. 6 is an elevational view in section diagrammatically illustrating an electroerosive wire cutting assembly with a plurality of wire electrodes shaped in cross section with different contours for machining a single workpiece in embodying the principles of the present invention.

FIG. 6 shows another wire-cutting electroerosion arrangement for machining a single workpiece 6 with a plurality of shaped wire electrodes, shown by three wires 31, 32 and 33. As in FIG. 1, the workpiece 6 is supported fixedly on the worktable 8 driven by motors 9 and 10. The arrangement includes three machining heads 34, 35 and 36 mounted on a shaft 37 securely held between a pair of arms 38 and 39 of a frame 40. Each of the machining heads 34, 35, 36 has parallel arms or projections 34a and 34b, 35a and 35b, 36a and 36b, each arm terminating at an end 41a, 41b, 42a, 42b, 43a, 43b. The arms 34b, 35b and 36b are shown carrying supply reels 44, 45 and 46 each for feeding a wire electrode 31, 32, 33. The wire electrodes 31, 32 and 33 are guided between the supports 41b and 41a, 42a and 42b, and 43b and 43a and collected onto takeup reels 47, 48 and 49, respectively, which are mounted on the arms 34a, 35a and 36a, respectively. The wire electrodes 31, 32 and 33 stored in and fed from the supply reels 44, 45 and 46 are of a regular cross-sectional contour and shaping devices 50, 51 and 52, each of which may be of any of the types mentioned previously, are disposed below the workpiece 6 to impart to these wires 31, 32 and 33 cross-sectional contours varied from the regular contour and preselected in conjunction with particular patterns of cut to be machined thereby in the workpiece 6. The shaping devices 50, 51 and 52 may be secured to the heads 34, 35 and 36, respectively. The heads 34, 35 and 36 may be rotatably mounted on the shaft 37.

In a given cutting operation, any one or two heads 34, 35 and/or 36 may be selected together with the respective shaping device or devices 50, 51 and/or 52 secured thereto and placed in engagement with the workpiece 6. The wire electrode 31, 32, 33 is fed from the supply reel 44, 45, 46 on the selected head 34, 35, 36 is guided over the support 41b, 42b, 43b and is passed through the shaping device 50, 51, 52 adapted to shape the wire with the preselected cross-sectional contour. The wire 31, 32, 33 then is passed into, through and out of the cutting zone to bring and maintain the shaped contour in the electroerosive wire-cutting relationship with the workpiece 6 while the latter is displaced relative to the wire axis along a prescribed path, thereby forming the corresponding pattern of cut with an increased accuracy or a desired characteristic in the workpiece 6. Upon completing the operation or when the operation is found to require in midoperation another cutting characteristic in conjunction with a particularity of the pattern being cut, the head used is replaced by another head and the wire-cutting operation is resumed to produce another pattern of cut or to continue the pattern of cut with the wire electrode shaped with another cross-sectional contour preselected to meet the pattern.

There are thus provided, in accordance with the present invention, a new and useful method of and apparatus for electroerosively wire-cutting a conductive workpiece whereby a desired pattern of cut can be obtained with an increased accuracy. The invention is particularly advantageous to achieve a corner cut with an increased or reduced sharpness as desired and to attain extremely intricate patterns of cut in a simplified manner.

What is claimed is:

1. A method of electroerosively wire-cutting a conductive workpiece with a continuous wire electrode supported to extend and axially transported continuously to move between a supply site and a collection site through a cutting zone, said method comprising the steps of:
    (a) feeding the wire electrode having a given cross-sectional contour from said supply site;
    (b) downstream of the supply site and upstream of the cutting zone, shaping said wire electrode and forming it with a cross-sectional contour varied in shape from said given cross-sectional contour and preselected in conjunction with a localized pattern of cut to be progressively machined in said workpiece;
    (c) feeding said wire electrode shaped with said preselected cross-sectional contour into said cutting zone to permit said shaped wire electrode to continuously move therethrough in an electroerosive wire-cutting relationship with said workpiece and to be fed continuously toward the collection site; and
    (d) effecting relative displacement between said moving wire electrode and said workpiece along a predetermined path to form the desired wire-cut pattern in said workpiece.

2. The method defined in claim 1 wherein the step (b) is carried out by drawing said wire electrode with said given cross-sectional contour through a die having a die surface complementary in shape to said preselected cross-sectional contour.

3. The method defined in claim 2 wherein prior to drawing, said wire electrode with the given cross-sectional contour is heated.

4. The method defined in claim 2 wherein subsequent to the drawing, said wire electrode shaped with said preselected cross-sectional contour is cooled.

5. The method defined in claim 2, claim 3 or claim 4 wherein during the drawing, vibrations of a sonic or ultrasonic frequency are imparted to said die.

6. The method defined in claim 1 wherein the step (b) is carried out by (b') electroerosively wire-cutting said wire electrode with the given cross-sectional contour to impart thereto said preselected cross-sectional contour.

7. The method defined in claim 6 wherein the step (b') is carried out by supporting a plurality of axially traveling wire electrodes arranged to provide electrode surfaces traversed by said wire electrode of the given cross-sectional contour to electroerosively shape it with said preselected contour.

8. An apparatus for electroerosively wire-cutting a conductive workpiece with a continuous wire electrode supported to extend and axially transported continuously to move between a supply site and a collection site through a cutting zone having said workpiece disposed therein, said apparatus comprising:
    (a) wire supply means disposed at a said supply site for feedng a wire electrode of a given cross-sectional contour.
    (b) shaping means disposed downstream of said supply means and upstream of a said cutting zone for shaping said wire electrode to form it with a cross-sectional contour varying in shape from said given cross-sectional contour and preselected in conjunction with a localized pattern of cut to be progressively machined in said workpiece;
    (c) wire feed means for feeding said wire electrode shaped with said preselected cross-sectional contour into said cutting zone to permit said shaped wire electrode to continuously move therethrough in an electroerosive cutting relationship with said workpiece and to be fed continuously toward a said collection site; and
    (d) contouring feed means for effecting relative displacement of said workpiece to said moving wire electrode along a predeteremind path to form the desired wire-cut pattern in said workpiece.

9. The apparatus defined in claim 8 wherein the shaping means (b) comprises drawing-die means comprising a die having a die surface complementary in shape to said preselected contour.

10. The apparatus defined in claim 9 wherein said drawing-die means comprises a plurality of such dies having such die surfaces with different shapes individually for use with different said preselected contours, respectively and capable of selectively being located in the path of axial feed of said wire electrode from said supply means.

11. An apparatus as defined in claim 9 or claim 10, further comprising heating means disposed upstream of said drawing-die means.

12. An apparatus as defined in claim 11, further comprising cooling means disposed downstream of said drawing-die means and upstream of said cutting zone.

13. An apparatus as defined in claim 9, further comprising vibrator means for imparting vibrations of a sonic or ultrasonic frequency to said die.

14. The apparatus defined in claim 8 wherein the shaping means (b) comprises electroerosion electrode means disposed in the path of travel of the wire electrode from said wire supply means (a).

15. The apparatus defined in claim 14 wherein said electroerosion electrode menas comprises a plurality of axially traveling wire electrodes arranged to provide electrode surfaces traversed by said wire electrode of the given cross-sectional contour to electroerosively shape it with said preselected contour.

* * * * *